United States Patent [19]

Huang

[11] Patent Number: 4,793,224

[45] Date of Patent: Dec. 27, 1988

[54] COMBINATION RETAINING RING FITTING TOOL

[76] Inventor: Hsin-Teh Huang, No. 12, Alley 3 South, Yung Hsin Lane, Wen Hwa Rd., Hsi Tun District, Taichung, Taiwan, Taiwan

[21] Appl. No.: 57,081

[22] Filed: Jun. 3, 1987

[51] Int. Cl.[4] .......................... B25B 7/12; B23P 19/04

[52] U.S. Cl. ........................................ 81/302; 81/485; 81/486; 81/385; 29/229

[58] Field of Search ................. 81/485, 486, 300, 302, 81/DIG. 6, 385-387, 391-392, 9.3; 29/225, 229

[56] References Cited

U.S. PATENT DOCUMENTS

| | | | |
|---|---|---|---|
| 3,040,420 | 6/1962 | Kulp | 81/302 X |
| 3,681,840 | 8/1972 | Pool | 81/302 X |
| 3,990,137 | 11/1976 | Kulba et al. | 81/302 X |
| 4,280,265 | 7/1981 | Murphy | 81/302 X |

*Primary Examiner*—Debra Meislin

*Attorney, Agent, or Firm*—Varndell Legal Group

[57] ABSTRACT

An improved combination retaining ring fitting tool comprising a pair of handles pivoted together at the joint center and having studs on both sides, and a pair of removable jaws pivoted together at the joint center and having stud holes, and connected by a pivot bolt so that when the handles are pressed together, the jaws will open or close to expand or pinch a retaining ring as an expander or pincher.

4 Claims, 3 Drawing Sheets

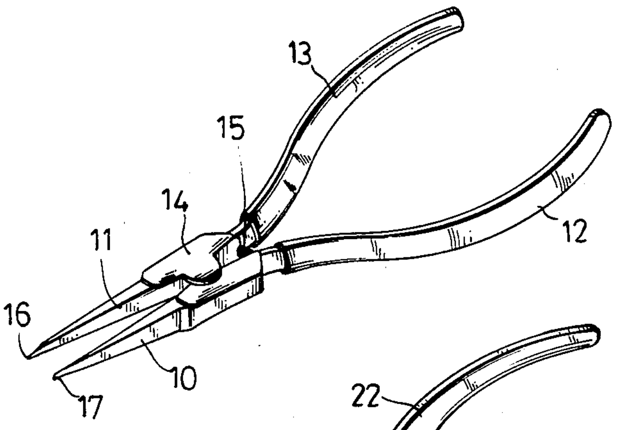
Fig. 1
PRIOR ART
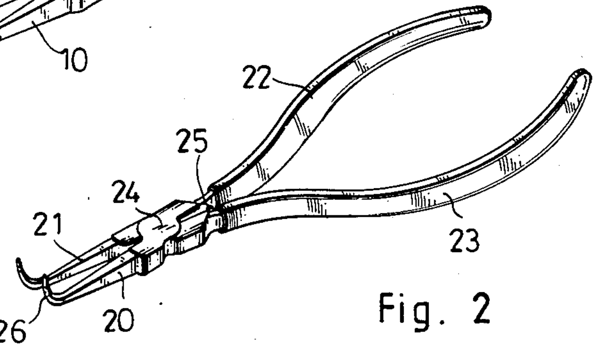
Fig. 2
PRIOR ART
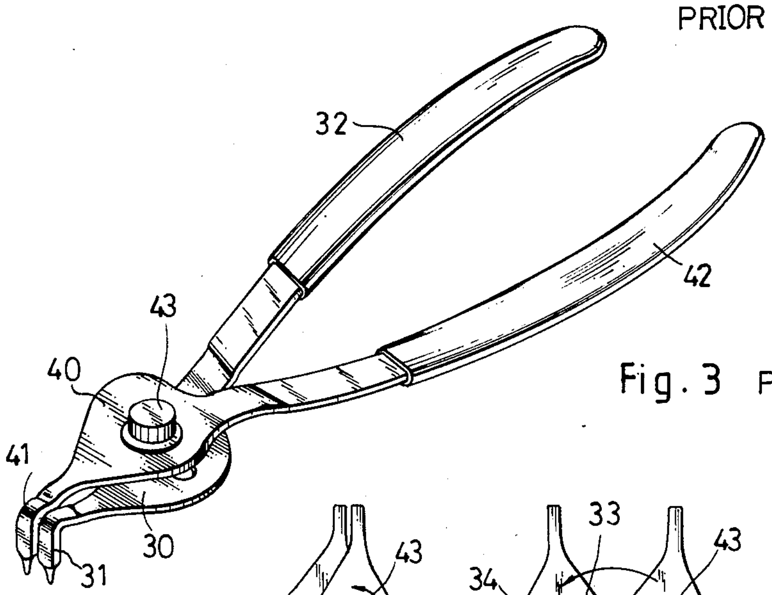
Fig. 3 PRIOR ART
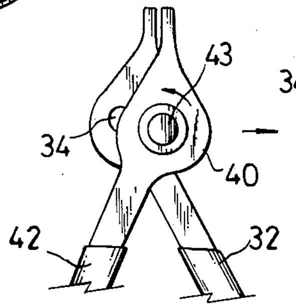
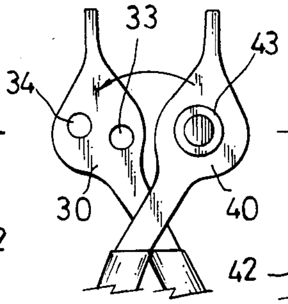
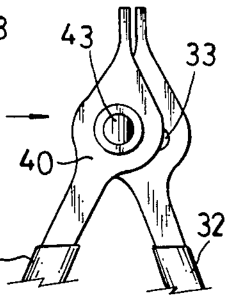
PRIOR ART Fig. 3-2 Fig. 3-1 Fig. 3-3

COMBINATION RETAINING RING FITTING TOOL

BACKGROUND AND SUMMARY OF THE INVENTION

Special tools are needed to fit retaining rings that are elastic. A conventional retaining ring expander as shown in FIG. 1 comprises two jaws 10, 11 and two handles 12,13 pivoted together at the center 14. When not in use, the handles 12, 13 are pushed open by a spring 15 and the jaws 10, 11 are closed. After the tips 16, 17 are inserted in the holes of a retaining ring (not shown) and the handles 12, 13 are pressed together, the jaws 10, 11 will be opened to expand the retaining ring. A conventional retaining ring pincher as shown in FIG. 2 also comprises two jaws 20, 21 and two handles 22, 23 intersectionally pivoted together at the center 24. When not in use, the handles 22, 23 are pushed open by a spring 25 and the jaws 20, 21 are open. When the handles 22, 23 are pressed together, the jaws 20, 21 will be closed to pinch the retaining ring.

To eliminate the disadvantages of such separate expander and pincher, a combination tool for fitting the retaining ring was developed. This conventional combination tool as shown in FIG. 3 comprises two jaws 31, 41 and two handles 32, 42 but a fixed bolt 43 is provided on the middle flat part 40 and two bolt holes 33, 34 are provided in the other relative part 30 as shown in FIG. 3-1. When the too parts are intersectionally pivoted together with a pivot bolt 43 in the hole 33 as shown in 3-2, it can be used as a pincher. When they are pivoted together with the pivot bolts 43 in the hole 34 as shown in FIG. 3—3, it can be used as an expander.

But since the two parts of the conventional combination tool are pivoted together with the pivot bolt in two different holes, there is no way to install a spring for pushing open the handles after being pressed together. They have to be pulled open by the hands. Thus it is very inconvenient to use.

Furthermore, since one jaw and one handle of the conventional tool are made in an integral part, straight tips 16, 17 and curved tips 26, 31, 34 must be provide to meet the actual fitting conditions and the user must acquire many kinds of tools with different tips for use. This is inconvenient for the consumer In view of these disadvantages, the inventor tried hard to make improvements and developed the present invention. A main object of this invention is to provide an improved combination retaining ring fitting tool which comprises a pair of handles and a plurality of removable and exchangeable pairs of jaws with straight or curved tips suitable for fitting(expanding and pinching)various retaining rings.

Another object of this invention is to provide an improved combination retaining ring fitting tool which is not only practical in use, but is also economical in production.

BRIEF DESCRIPTION OF THE DRAWINGS

FIG. 2 is a vertical view of the conventional retaining ring pincher.

FIG. 3 is a vertical view of the conventional combination retaining ring fitting tool.

FIG. 3-1 illustrates the two parts of the said conventional combination tool.

FIG. 3-2 illustrates the said conventional combination tool used as a pincher.

FIG. 3-3 illustrates the said conventional combination tool used as an expander.

FIG. 4 illustrates the pivot of the said improved combination tool.

DETAILED DESCRIPTION OF THE PREFERRED EMBODIMENT

Figure 4:
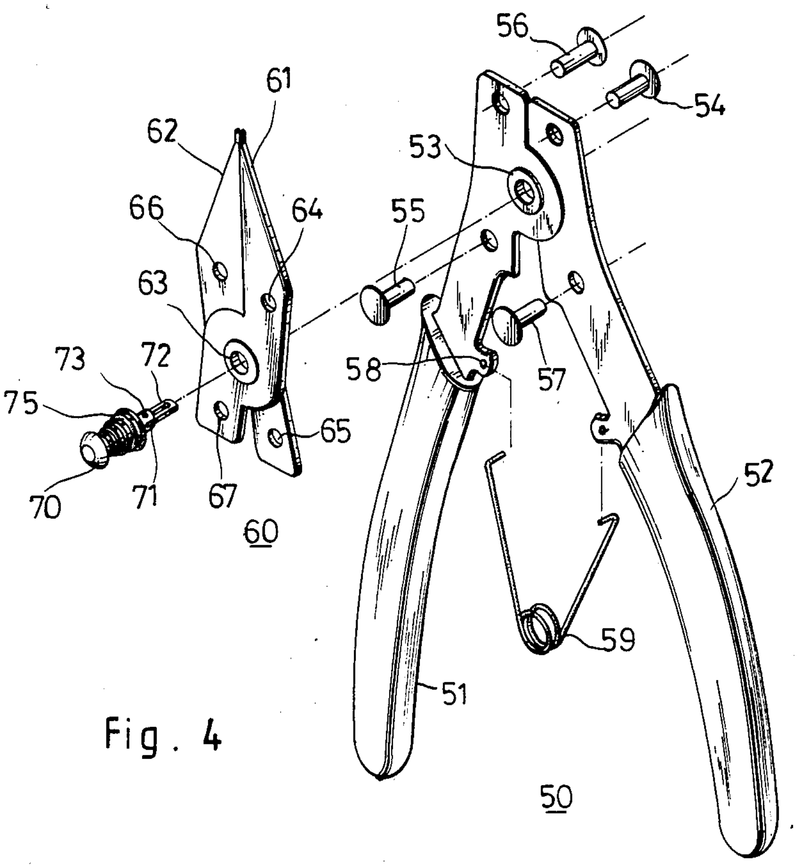
FIG. 4 is an exploded view of the improved combination retaining ring fitting tool of this invention.
Figures 1, 4:
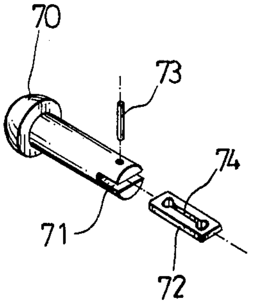
FIG. 1 is a vertical view of the conventional retaining ring expander.

Referring now to the drawings, the nature of this invention is described as follows:

As shown in FIG. 4 the improved combination retaining ring fitting tool comprises a pair 50 of handles 51, 52 pivoted together at the joint center 53 and having two pairs of studs 54, 55, 56, 57, one pair 54, 56 on the front side above the center 53 and another 55, 57 on the reverse side below the center 5,, and a pair of projections 58 for a spring 59 to fit on and to keep the handles 51, 52 open; and a pair 60 of jaws 61, 62 pivoted together at the joint center 63 and having two pairs of through holes 64, 65, 66, 67 for the said studs 54, 56, 57, 55 to fit in. The said two pairs 50, 60 are joined with a pivot bolt 70 in the central holes 63, 53. To facilitate removing, the pivot bolt 70 has an open slot 71 at one end for a latch 72 to fit in. The latch 72 with a closed slot 74 is movably fixed in the open slot 71 of the pivot bolt 70 by a pin 73, so that the latch 72 can be set in a straight line with the pivot bolt 70 for inserting in the central holes 63, 53 and set cross with the pivot bolt 70 after coming out of the central holes 63, 53 to work with a spring 75 to lock the two pairs 50, 60.

Figure 6:
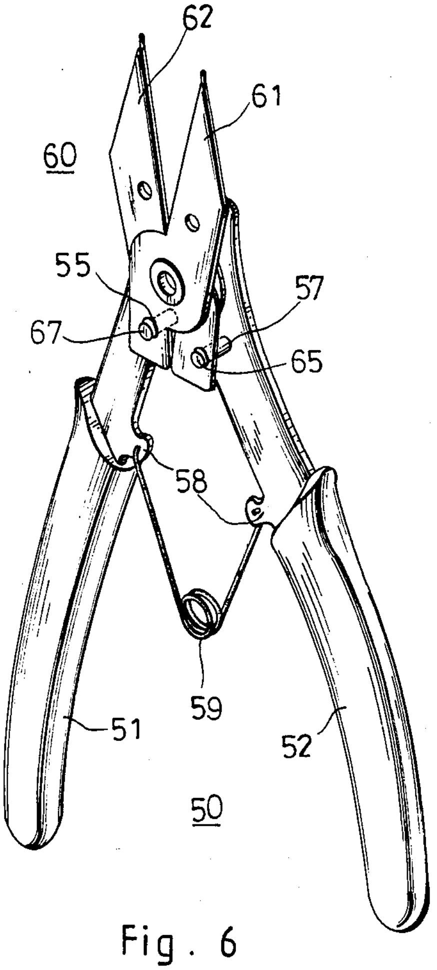
FIG. 6 illustrates the said improved combination tool used as a pincher.
Figure 5:
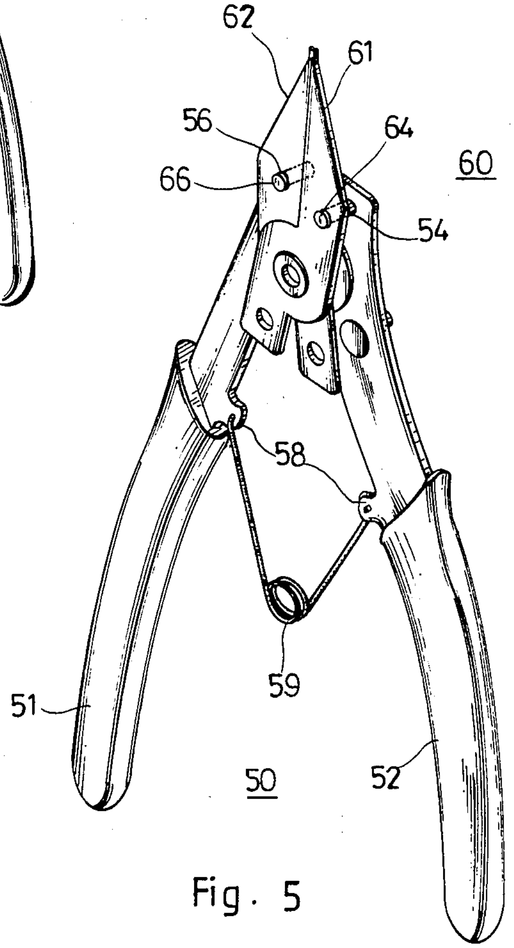
FIG. 5 illustrates the said improved combination tool used as an expander.

As shown in FIGS. 5 and 6, when the pair 50 of handles 51, 52 and the pair 60 of jaws 61, 62 are joined by the pivot bolt 70 (not shown) with the upper studs 54, 56 of the handles 52, 51 fitted in the corresponding holes 64, 66, it becomes a tool with the handles 51, 52 open and the jaws 61, 62 closed and can be used as a retaining ring expander. If the two pairs 50, 60 are joined with the lower studs 55, 57 fitted in the corresponding holes 67, 65, it becomes a retaining ring fitting tool with the handles 51, 52 open and the jaws 50, 60 open and can be used as a retaining ring pincher.

Different kinds of straight and curved jaw tips can be provided so that the improved retaining ring fitting tool with one pair of handles and a plurality of exchangeable pairs of jaws can be used to fit various retaining rings. While the above describes that the studs are provided on the handles and the holes are provided on the jaws, alternatively the studs can be provided on the jaws and the holes can be provided on the handles.

While the forgoing embodiment of this invention have been set forth in considerable detail, it may be apparent that numerous changes such as the change of studs and holes each other may be made without departing from the spirit and principles of this invention.

I claim:

1. An improved combination retaining ring fitting tool comprising a pair of handles joined together at a handle joint center and a pair of jaws joint together at a jaw joint center, the pair of handles and the pair of jaws being removably fastened together by an open-slotted pivot bolt and a latch, the latch being rotatably mounted within the open slot of the pivot bolt by a pin, such that the pivot bolt together with the latch passes through the handle joint center and the jaw joint center and after passing therethrough the latch is rotated to prevent the pivot bolt from being removed therefrom, the pair of handles having a first pair of studs arranged above the handle joint center and a second pair of studs arranged below the handle joint center, one stud of each of the first and second pairs of studs being present on each handle, the pair of handles also having a pair of projections with a spring arranged therebetween for keeping the pair of handles open, the pair of jaws having a first pair of holes arranged above the jaw joint center and a second pair of holes arranged below the jaw joint center, one hole of each of the first and second pairs of holes being present on each jaw, the pair of jaws also having ring engaging tips on an end thereof, and the first and second pair of studs and the first and second pair of holes being capable of two arrangements, the first arrangement being the first pair of studs passing through the first pair of holes so that closing action on the pair of handles causes the pair of jaws to open, and the second arrangement being the second pair of studs passing through the second pair of holes so that closing action on the pair of handles causes the pair of jaws to close.

2. An improved combination retaining ring fitting tool as set forth in claim 1, wherein the first and second pair of studs project perpendicularly from the handle, the first set of studs projecting in a direction opposite to that of the second pair of studs.

3. An improved combination retaining ring fitting tool as set forth in claim 1, wherein the ring engaging tips are straight tips.

4. An improved combination retaiing ring fitting tool as set forth in claim 1, wherein the ring engaging tips are curved tips.

* * * * *